June 14, 1938.  C. C. MATTHIESEN  2,120,619
FIXTURE SUPPORT
Filed Feb. 27, 1937
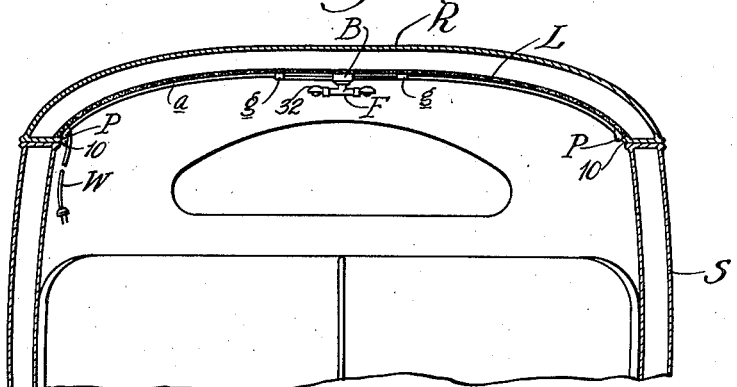
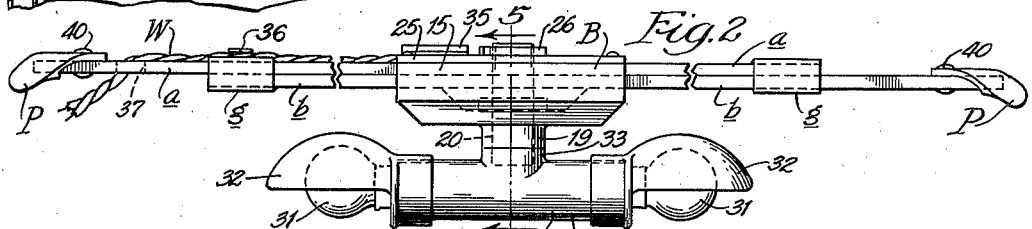
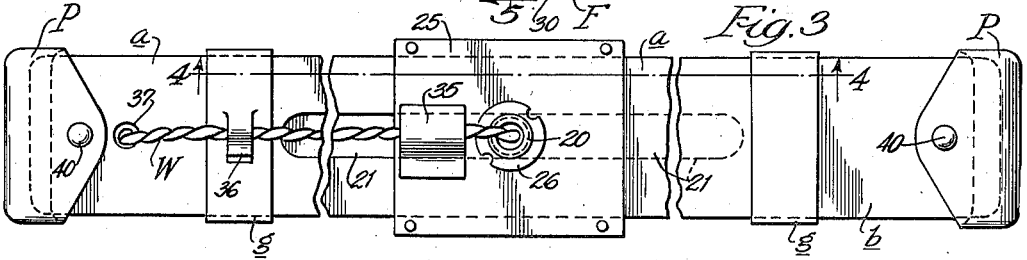
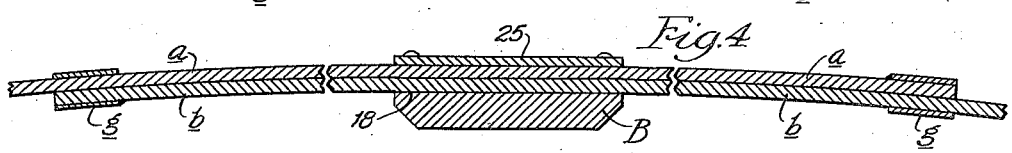
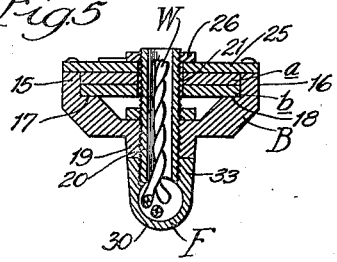
Inventor:
Charles C. Matthiesen,
By Dummy & Dummy
Attorneys Patented June 14, 1938

2,120,619

UNITED STATES PATENT OFFICE 2,120,619

FIXTURE SUPPORT

Charles C. Matthiesen, Clinton, Iowa

Application February 27, 1937, Serial No. 128,209

9 Claims. (Cl. 248—205)

This invention relates to a support for an illuminating fixture adapted particularly for attachment within an automobile body for improved display of its interior. It is accordingly an object of my invention to devise for the purpose indicated a fixture support which will be simple, inexpensive, easily applied or removed, and which will be handsome to the extent at least of harmonizing with the interior finish of the automobile body with which it may be used.

Automobiles on display in sales rooms and at shows are generally illuminated to advantage so far as concerns their exteriors, but not so their interiors, which have usually been neglected. Either the small dome light built into the automobile is relied upon to furnish illumination for the interior, or some ill-fitting and inappropriate lighting fixture is employed in a disadvantageous manner. Little or no attention has been paid, so far as I am aware, to the production of a light fixture which is designed specially for effective use under the conditions mentioned.

The light fixture presently to be described is advantageous in that it may be affixed in position without in any way marring or altering the automobile itself. This operation requires but a few seconds, as does also the reverse operation of removing the fixture. When applied in place, the light is positioned adjacent the roof of the automobile where it is out-of the way, yet where the illumination afforded thereby is most effective. In addition, the fixture may be finished to blend harmoniously with the interior fittings of the automobile. Its exact location in use may be varied to suit individual preferences.

An exemplification of this invention is set forth in the accompanying drawing, wherein—

Figure 1 is a transverse section through a conventional automobile body showing the fixture support in place therewithin;

Fig. 2 is a side elevation of the support removed from the automobile body;

Fig. 3 is a top plan view thereof;

Fig. 4 which is a detail in longitudinal section taken on line 4—4 of Fig. 3 indicates the manner in which the support is bowed endwise when in service; and Fig. 5 is a detail in transverse section taken on line 5—5 of Fig. 2.

The automobile body illustrated in Fig. 1 is conventional in that it embodies a roof R joined to or integral with sides S, both reinforced by appropriate framework as is common. Interiorly the body is equipped with a lining L, usually of fabric or textile material. The roof is shown as crowned in accordance with current practice. A bead 10 is customarily provided at or about the heighth of the lintels for the doors and windows.

The present fixture support is adapted for use with automobile bodies of this general character. It is intended that the support should extend across the body, preferably transversely thereof, with its opposite ends exerting a thrust pressure against or adjacent the beads. When in service the support is longitudinally bowed upwardly so as to lie adjacent the roof lining where it lies nicely out of the way. The position which the support may occupy within the automobile body is largely a matter of choice—it may be shifted forwardly or rearwardly or perhaps transversely, so as to occupy whatever location is of maximum advantage.

The support which I have here illustrated comprises a pair of like resilient struts $a$ and $b$ in overlapping relation, adapted to be adjusted lengthwise of each other within a considerable range. The strut $a$, here represented as the upper one, is slidably connected to the under strut $b$ by a pair of guides $g$, each of which engages both struts upon remote faces thereof. One guide is desirably affixed to one strut adjacent an end thereof, the remaining guide being secured to the other strut adjacent its end. As the two struts are extended lengthwise, the guides approach each other, whereas with an opposite adjusting movement the guides are caused to recede from each other. Each guide is desirably formed of a metallic band whose ends may, if desired, be joined, the confined struts being thereby maintained in engaging relation so that an appreciable degree of friction is produced therebetween.

A lighting fixture is adjustably carried on such a strut support, preferably at a point substantially midway between its two ends. As shown in Fig. 5, this fixture may comprise a base block B which is channeled endwise to provide opposing walls 15 and 16 adapted to receive between them the two struts; shoulders 17 and 18 upon which the lower strut $b$ may be rested at such an elevation that the top face of the upper strut will lie about flush with the tops of the walls 15 and 16; and a downwardly depending collar 19 which is interiorly threaded to receive a nipple 20 which extends upwardly through the block channel and through registering slots 21 in the two struts. These slots are of sufficient length to allow a desired range of adjusting movements for the struts. A cover plate 25 is fitted over the block so as to rest upon the top face of its walls 15 and 16, and also to engage with the top face of the upper strut *a*. This plate is apertured to permit the nipple to extend therethrough for receiving at its upper end a nut 26 by which a compressive force may be applied to the plate, thereby exerting upon the top strut a pressure which will increase its friction with the lower strut.

With such a block I associate a lighting fixture F which may comprise a tubular body 30 having at its opposite ends sockets for the reception therein of electric lamps 31 over which may be fitted rotatively adjustable reflectors 32, all as shown best in Fig. 2. Rising from the body of the fixture is a neck 33 which abuts the collar 19 depending from the block. The nipple which extends through the collar is in threaded engagement with the neck whereby the fixture is secured to the block.

Electrical connections in the form of wires W extend from the fixture through the nipple and then laterally from its upper end beneath a spring clip 35 that is carried on the top plate. These wires extend lengthwise in one direction along the top face of the upper strut where they may be additionally secured, as by a clip 36 on one of the guides *g*. The wires may then pass through an opening 37 in the end region of the support, continuing on through a window opening to a source of electric current which is exteriorly of the automobile.

It may be desirable to affix to opposite ends of the support feet in the form of pads P. As shown, each pad may comprise a rubber shoe which is socketed to receive one strut end where it may be secured as by a rivet 40. The purpose of these pads is to afford at opposite ends of the support some sort of a cushion which will avoid marring or defacing of the interior finish of the automobile body when in engagement therewith.

In practice, the support is set in place much as shown in Fig. 1. Normally, the support extends in a straight line, so that in reaching a position which conforms to the crown of the automobile roof it is required to bow endwise. The two struts are extended lengthwise a sufficient distance to place the feet at points adjacent the sides of the automobile body, preferably at or near the beads 10 where they may exert a thrust force to advantage. As the result of bowing the frictional resistance between the two struts is appreciably enhanced, so that the support will remain securely in any position. If desired, the nut 26 may be tightened, as required, to further enhance the friction between the two struts at the center point, so as to assure maintenance of the support in all adjusted positions.

It is obvious that the operation of installing the fixture support requires but a few moments of time. No preliminary or preparatory work of any kind is required. The automobile body is not defaced or marred in any way. The light which is thereby positioned within the body lies close to its ceiling which receives protection from the heat by the reflectors which may be turned to direct the light rays, as desired. The fixture may also be shifted endwise of the support, should an off-center position be preferred. When it is desired to remove the support for transference to and installation within another automobile body, the reverse operation requires but a few seconds. It is accordingly manifest that the device in question is eminently practical in that it may be used by anyone having little or no skill in the attachment of electrical appliances.

I claim:

1. For use within an automobile body, a fixture support comprising a pair of normally straight overlapping resilient struts, and means connecting the struts for relative sliding movement adapted when the struts are bowed endwise to engage with increasing friction therewith whereby to enhance resistance to further sliding movement, the remote ends of the support being fashioned to engage with opposite sides of the automobile body whereby to maintain the support under compression endwise in a bowed position adjacent the under side of the roof thereof.

2. For use within an automobile body, a fixture support comprising a pair of normally straight overlapping resilient struts, and means connecting the struts for relative sliding movement adapted to engage therewith frictionally whereby normally to resist sliding movements therebetween, the remote ends of the support being fashioned to engage with opposite sides of the automobile body whereby to maintain the support under compression endwise in a bowed position adjacent the under side of the roof thereof.

3. For use within an automobile body, a fixture support comprising a pair of normally straight overlapping resilient struts, means connecting the struts for relative sliding movement, and a fixture carried by the support including parts adapted to exert a variable compressive force on the two struts whereby to oppose sliding movement therebetween, the remote ends of the support being fashioned to engage with opposite sides of the automobile body whereby to maintain the support under compression endwise in a bowed position adjacent the under side of the roof thereof.

4. For use within an automobile body, a fixture support comprising a pair of normally straight overlapping resilient struts together with means connecting the struts non-rotatively for relative sliding movement adapted when the struts are bowed endwise to engage with increasing friction therewith whereby to enhance resistance to further sliding movements therebetween.

5. For use within an automobile body, a fixture support comprising a pair of normally straight overlapping resilient struts together with means connecting the struts for relative sliding movement adapted to engage therewith with sufficient friction to resist free sliding movements thereof, and a fixture carried by the support having means in frictional engagement with the two struts whereby to additionally oppose sliding movements therebetween.

6. For use within an automobile body, a fixture support comprising a normally straight relatively flat resilient strut having its ends fashioned to engage with opposite sides of the automobile body whereby to maintain the support under compression endwise in a bowed position flatwise adjacent the under side of the roof thereof, and a fixture slidably carried on the strut whereby to occupy a selected position endwise thereof.

7. For use within an automobile body, a fixture support comprising a normally straight relatively flat resilient strut having its ends fashioned to engage with opposite sides of the automobile body whereby to maintain the support under compression endwise in a bowed position flatwise adjacent the under side of the roof thereof.

8. For use within an automobile body, a fixture support comprising a normally straight relatively flat resilient strut having its ends fashioned to engage with opposite sides of the automobile body whereby to maintain the support under compression endwise in a bowed position flatwise adjacent the under side of the roof thereof, and a fixture rotatively and slidably carried on the strut whereby to occupy a selected adjusted position thereupon.

9. For use within an enclosing body, a fixture support comprising a normally straight relatively flat resilient strut having its ends fashioned to engage with opposite sides of the enclosing body whereby to maintain the support under compression endwise in a bowed position flatwise adjacent the under side of the roof thereof, and means for moving the engaging ends of the strut non-rotatively relatively toward or from each other whereby to adjust the support for spans of varying length.

CHARLES C. MATTHIESEN.